United States Patent
Wang

(10) Patent No.: US 9,280,040 B2
(45) Date of Patent: Mar. 8, 2016

(54) PROJECTION SCREEN AND PROJECTION SYSTEM USING THE SAME

(71) Applicant: DELTA ELECTRONICS, INC., Taoyuan Hsien (TW)

(72) Inventor: Yu-Chang Wang, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 0 days.

(21) Appl. No.: 14/483,978

(22) Filed: Sep. 11, 2014

(65) Prior Publication Data

US 2015/0370157 A1     Dec. 24, 2015

(30) Foreign Application Priority Data

Jun. 20, 2014  (TW) .............................. 103121286 A

(51) Int. Cl.
  *G03B 21/625*  (2014.01)
  *G03B 21/602*  (2014.01)

(52) U.S. Cl.
  CPC ............ *G03B 21/625* (2013.01); *G03B 21/602* (2013.01)

(58) Field of Classification Search
  CPC .... G03B 21/56; G03B 21/606; G03B 21/625; G03B 21/602
  USPC .......................... 359/449, 459, 458, 446, 456
  See application file for complete search history.

(56) References Cited

U.S. PATENT DOCUMENTS

| | | | | |
|---|---|---|---|---|
| 1,882,829 A | * | 10/1932 | Hall ............................... | 359/455 |
| 5,096,278 A | * | 3/1992 | Yoshioka et al. ............. | 359/459 |
| 5,473,469 A | * | 12/1995 | Magocs et al. ................. | 359/449 |
| 5,614,941 A | | 3/1997 | Hines | |
| 6,511,182 B1 | | 1/2003 | Agostinelli et al. | |
| 7,324,276 B2 | * | 1/2008 | Wood ............................. | 359/449 |
| 7,667,893 B2 | * | 2/2010 | Peterson et al. ............... | 359/455 |
| 7,699,472 B2 | | 4/2010 | Shestak | |
| 7,715,098 B1 | * | 5/2010 | Sweatt .......................... | 359/455 |
| 7,961,390 B2 | * | 6/2011 | Shiau et al. .................... | 359/454 |
| 7,990,614 B2 | * | 8/2011 | Chou ............................. | 359/454 |
| 8,243,127 B2 | | 8/2012 | Goulanian et al. | |
| 8,982,459 B1 | * | 3/2015 | Coley et al. .................... | 359/458 |
| 2003/0137728 A1 | | 7/2003 | Kuroda et al. | |
| 2006/0291050 A1 | | 12/2006 | Shestak et al. | |
| 2011/0194178 A1 | * | 8/2011 | Katsuma et al. ............... | 359/459 |

FOREIGN PATENT DOCUMENTS

| | | |
|---|---|---|
| CN | 100559264 | 11/2009 |
| CN | 102445762 | 5/2012 |
| JP | 2013-15615 | 1/2013 |
| TW | 201017312 | 5/2010 |
| TW | I327253 | 7/2010 |
| TW | I378314 | 12/2012 |
| TW | I385467 | 2/2013 |

* cited by examiner

*Primary Examiner* — Christopher Mahoney
(74) *Attorney, Agent, or Firm* — Hauptman Ham, LLP

(57) ABSTRACT

A projection screen includes a reflector and a plurality of compound lenses. The compound lenses are arranged at the same side of the reflector in an array manner. Each of the compound lenses has a first lens portion and a second lens portion. The first lens portion is disposed between the second lens portion and the reflector. A surface of the first lens portion opposite to the reflector has a first radius of curvature, and a surface of the second lens portion opposite to the reflector has a second radius of curvature. The first radius of curvature has a length greater than the second radius of curvature.

10 Claims, 5 Drawing Sheets

225 223 224 222
220   240 230 210

PROJECTION SCREEN AND PROJECTION SYSTEM USING THE SAME

RELATED APPLICATIONS

This application claims priority to Taiwan Application Serial Number 103121286, filed Jun. 20, 2014, which is herein incorporated by reference.

BACKGROUND

1. Field of Invention

The present invention relates to a projection screen.

2. Description of Related Art

Currently, projection screens generating stereoscopic images with lens pupil scanning method are mostly transmission screens. FIG. 7 is a schematic diagram of a conventional transmission projection screen. In general, the transmission projection screen includes a Fresnel lens 910, double lenticular lenses 920 and 930, and a diffuser 940. The Fresnel lens 910 converges the diffusing light emitted from a projector (not shown) to parallel light, and the lenticular lens 920 images the parallel light onto the diffuser 940. Subsequently, the lenticular lens 930 images the images on the diffuser 940 to different views. This method faces problems such as the Fresnel lens 910 itself refracts different color lights (such as red, blue, and green lights) to different positions due to its chromatic aberration, such that the lights are unable to be projected on the correct views. For an image system including the lenticular lens 920, the F number must be greater to maintain an acceptable image quality. Therefore, the back focus of the lenticular lens 920 is increased, resulting in a large screen thickness. Moreover, since the Fresnel lens 910 is a thin lens composed by many tiny surfaces, which generates moire with the lenticular lenses 920 and 930. The diffuser 940 decreases the image quality, thereby creating a deteriorating crosstalk problem. In addition, the diffuser 940 repeats views, and as a result, view reversion area unavoidably occurs on the projection screen.

SUMMARY

An aspect of the present invention is to provide a projection screen including a reflector and a plurality of compound lenses. The compound lenses are arranged at the same side of the reflector in an array manner. Each of the compound lenses has a first lens portion and a second lens portion. The first lens portion is disposed between the second lens portion and the reflector. A surface of the first lens portion opposite to the reflector has a first radius of curvature, and a surface of the second lens portion opposite to the reflector has a second radius of curvature. The first radius of curvature has a length greater than the second radius of curvature.

In one or more embodiments, the reflector is a curved mirror, and the compound lenses are assembled to be a plurality of compound lens units arranged along the reflector in an array manner.

In one or more embodiments, the projection screen further includes a plurality of transition and tilt mechanism respectively connected to the compound lens units for respectively controlling positions and angles of the compound lens units.

In one or more embodiments, the projection screen further includes a plurality of black material layers respectively covering sides of the compound lens units.

In one or more embodiments, the projection screen further includes a plurality of black material layers respectively disposed between the reflector and the compound lenses. Each of the black material layers has an opening to expose a portion of the reflector.

In one or more embodiments, the reflector is a spherical surface mirror.

In one or more embodiments, the projection screen further includes an achromatic lens disposed between the compound lenses and the reflector.

Another aspect of the present invention is to provide a projection system including a projector and the projection screen. The projector is configured for providing a plurality of projection images. The projection images are incident of the projection screen from the first lens portions of the compound lenses, and emerge from the second lens portions of the compound lenses after being reflected by the reflector.

In one or more embodiments, each of the projection images has a plurality of pixels, the light of the pixels are respectively incident the compound lenses.

In one or more embodiments, the projection images are normally incident of the compound lenses.

DETAILED DESCRIPTION

Figure 1:
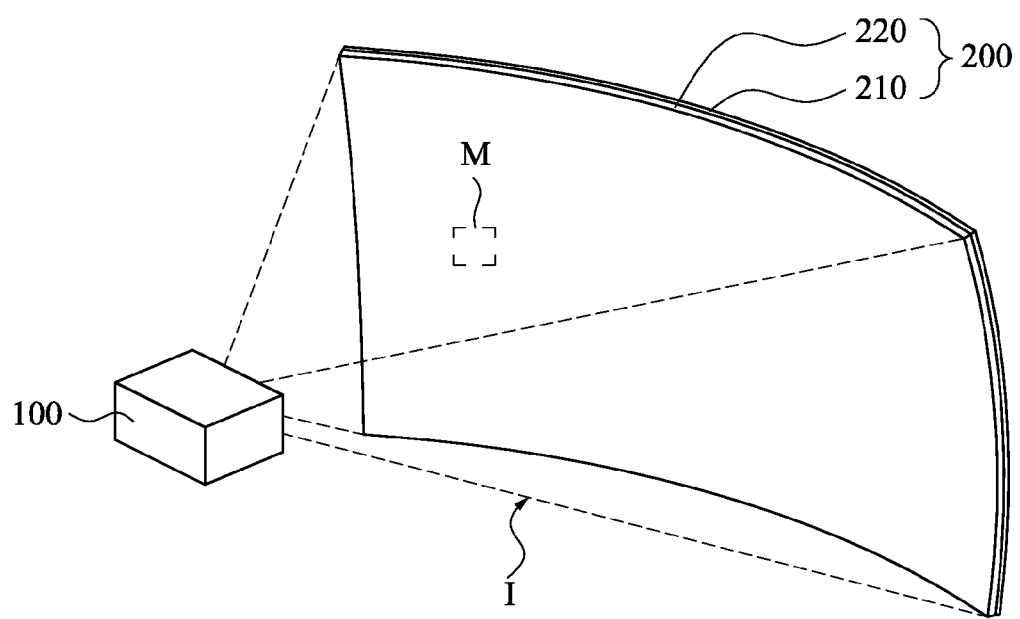
FIG. 1 is a three-dimensional diagram of a projection system according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
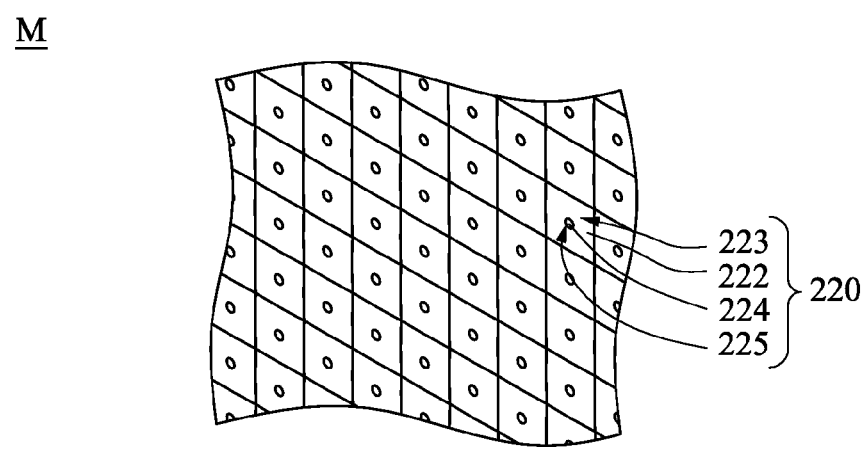
FIG. 2 is an enlarged diagram of area M of FIG. 1.
Figure 3:
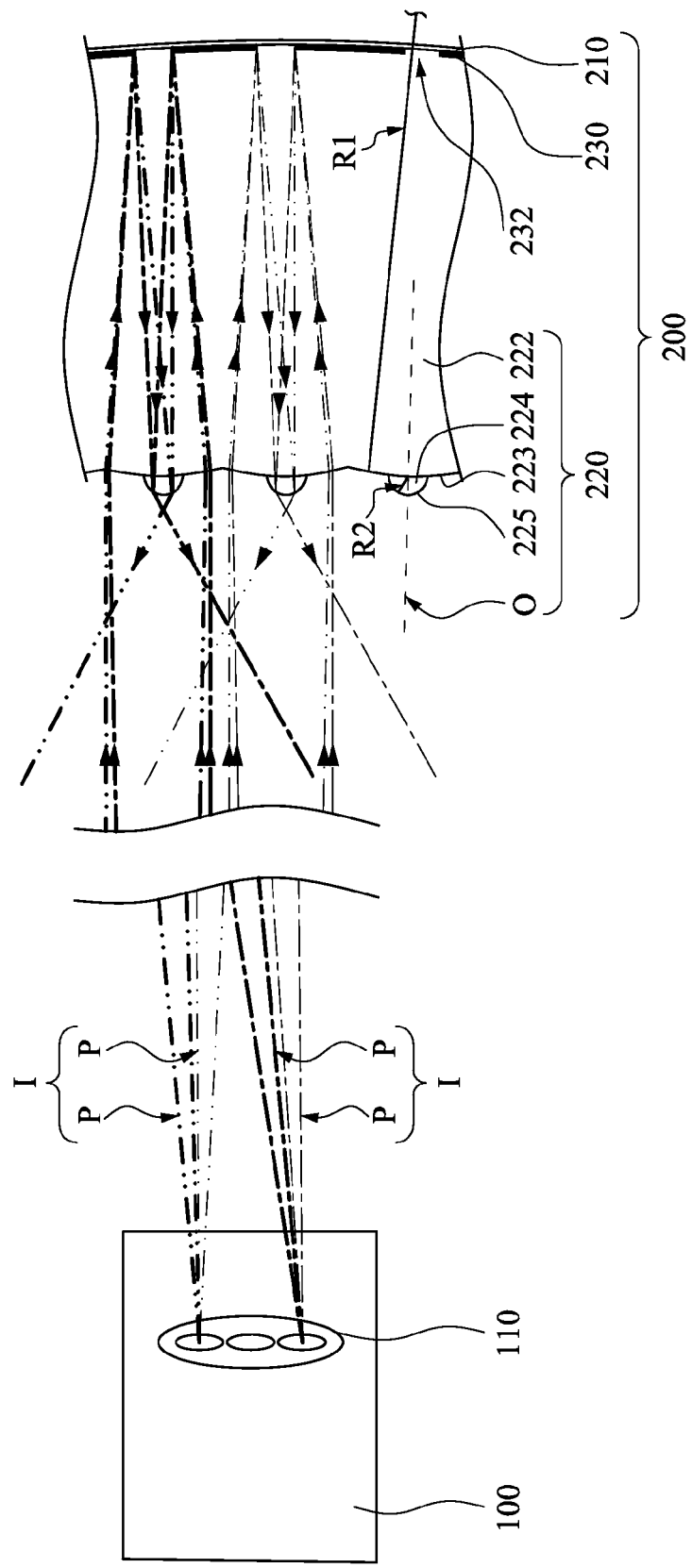
FIG. 3 is a local top view of the projection system of FIG. 1.

FIG. 1 is a three-dimensional diagram of a projection system according to one embodiment of the present invention, FIG. 2 is an enlarged diagram of area M of FIG. 1, and FIG. 3 is a local top view of the projection system of FIG. 1. The projection system includes a projector 100 and a projection screen 200. The projector 100 is configured for providing a plurality of projection images I. In FIG. 3, different projection images I are depicted with different dashed lines. For the sake of clarity, only two views of the projection images I are depicted in FIG. 3. However, the number of the projection images I depends on actual requirements. The projection screen including a reflector and a plurality of compound lenses. The projection screen 200 includes a reflector 210 and a plurality of compound lenses 220. The compound lenses 220 are arranged at the same side of the reflector 210 in an array manner. Each of the compound lenses 220 has a first lens portion 222 and a second lens portion 224. The first lens portion 222 is disposed between the second lens portion 224 and the reflector 210. A surface 223 of the first lens portion 222 opposite to the reflector 210 has a first radius of curvature R1, and a surface 225 of the second lens portion 224 opposite to the reflector 210 has a second radius of curvature R2. The first radius of curvature R1 has a length greater than the second radius of curvature R2. That is, the refractive degree of the surface 223 is slighter than that of the surface 225.

In operation, the projection images I provided by the projector 100 are incident the projection screen 200 from the first lens portions 222 of the compound lenses 220, and emerge from the second lens portions 224 of the compound lenses 220 after being reflected by the reflector 210. For a single compound lens 220, portions of the projection images I are incident the surface 223 and are refracted and focused. The projection images I are then reflected by the reflector 210, focusing and imaging near the surface 223, passing through the surface 225 of the second lens portion 224 and then leaving after refraction and diversion. Since the second radius of curvature R2 has a length shorter than the first radius of curvature R1, the diverging angles of the projection images I passing through the second lens portions 224 are greater than the converging angles of the projection images I passing through the first lens portions 222. Hence, both the projection images I themselves and the spaces between views of the projection images I are enlarged after the projection images I emerge from the projection screen 200.

The projection screen 200 in this embodiment is a reflective screen. Due to the compound lenses 220, the projection images I provided by the projector 100 can be enlarged and projected to different views. The assembly of the reflector 210 and the compound lenses 220 can reduce the whole thickness of the projection screen 200, in which the thickness is about a half focus of the first lens portion 222. To compare with a conventional transmission projection screen, the projection screen 200 of this embodiment is thinner and has lower weight, saving the cost of elements and reducing the whole volume and installation space. Moreover, since the first lens portions 222 and the second lens portions 224 enlarge the projection images I both horizontally, i.e., along the arrangement direction of the views, and vertically, a diffuser which vertically enlarges the image can be omitted. Therefore, the cost of elements can be further saved and the weight of the projection screen 200 can be reduced. Also, there are no crosstalk and view reversion problems caused by the diffuser.

Reference is made to FIGS. 1 and 3. In this embodiment, each of the projection images I has a plurality of pixels. The light beams P of the pixels are respectively incident the compound lenses 220. That is, each of the pixels corresponds to one of the compound lenses 220. The light beams P of different pixels are indicated with different line widths in FIG. 3. For the sake of clarity, only the light beams P of two pixels are shown in FIG. 3. The number of the pixels depends on actual requirements. Since the propagation path of the light beams P of each of the pixels are slightly different from each other, each of the compound lenses 220 can be adjusted according to different pixels, such that the light beam P of each pixel can be projected to suitable spatial positions.

In one or more embodiments, the projection images I can be normally incidental to the compound lenses 220. In other words, each of the compound lenses 220 normally faces the exit pupil 110 of the projector 100. The terms "normally incidental" herein represent that the projection images I of all views are symmetric with respect to the optical axis O of the compound lens 220. That is, the projection images I of the first view and the last view are symmetric with respect to the optical axis O. More specifically, the tilt angle of each of the compound lenses 220 that faces the projector 100 can be designed, such that the light beams P of the pixels of the projection images I can be normally incident the corresponded compound lens 220. Therefore, a Fresnel lens can be omitted, which further saves the cost of elements and reduces the weight of the projection screen 200. Also, there is no moire among the projection images I. Furthermore, since the conventional transmission projection screen includes Fresnel lens, different color lights (such as red, green, and blue lights) generate chromatic aberration (i.e., horizontal dispersion) when the respective lights are refracted by the different regions of the Fresnel lens. However, in this embodiment, the light beam P of each of the pixels is normally incident the compound lenses 220, such that the Fresnel lens can be omitted to avoid the horizontal dispersion.

In this embodiment, the reflector 210 can be a curved mirror, such as a spherical surface mirror. More specifically, the projection images I provided by the projector 100 generally are spherical images. To allow the projection images I to be normally incidental to the compound lenses 220, the reflector 210 can be designed as a spherical surface mirror, and the compound lenses 220 are arranged along a reflective surface of the reflector 210. That is, the whole projection screen 200 is spherical in shape. Moreover, since the compound lenses 220 are arranged along the reflective surface of the reflector 210, optical axes O of the compound lenses 220 can be perpendicular to the reflective surface of the reflector 210. Therefore, the thickness of each of the compound lenses 220 is the same to simplify and unify the design and the manufacturing of the compound lenses 220.

Reference is made to FIG. 2. In this embodiment, the first lens portion 222 and the second lens portion 224 can be integrally formed, and the second lens portion 224 is budged from the surface 223 of the first lens portion 222. Therefore, the compound lenses 220 can be formed using the same mold, thereby simplifying the mold, manufacturing, and assembly. Both of the first lens portion 222 and the second lens portion 224 are axial symmetric. The first lens portion 222 can be square column in shape, and the second lens portion 224 can be spherical in shape. An area of an orthogonal projection of the second lens portion 224 on the surface 223 can be 25% smaller than an area of the surface 223. That is, even though portions of the projection images I (see FIG. 3) are incident the projection screen 200 from the second lens portion 224, the impact fairly small. Moreover, the second lens portion 224 is disposed on the center of the surface 223. Furthermore, both of optical axes of the first lens portion 222 and the second lens portion 224 are the optical axis O (see FIG. 3) of the compound lens 220 to ensure the projection images I incident the compound lens 220 from the first lens portion 222 can be focused to the second lens portion 224, and emerge from the second lens portion 224.

Reference is made to FIG. 3. In one or more embodiments, the projection screen 200 can further include a plurality of black material layers 230 respectively disposed between the reflector 210 and the compound lenses 220. Each of the black material layers 230 has an opening 232 to expose a portion of the reflector 210. In greater detail, as mention above, the projection images I incident the projection screen 200 are focused by the first lens portion 222. In other words, the spot sizes of the projection images I on the reflector 210 are shrunk. For example, the spot sizes are shrunk to about 25% of the areas of the surfaces 223. The positions of the spots can correspond to the positions of the openings 232. That is, the area of each of the openings 232 is about 25% of the area of the surface 223, and the claimed scope of the present invention is not limited in this respect. The area not impinged by the projection images I can be covered with the black material layers 230 to reduce the effect of ambient light and enhance the contrast ratio of the projection images I.

Figure 4:
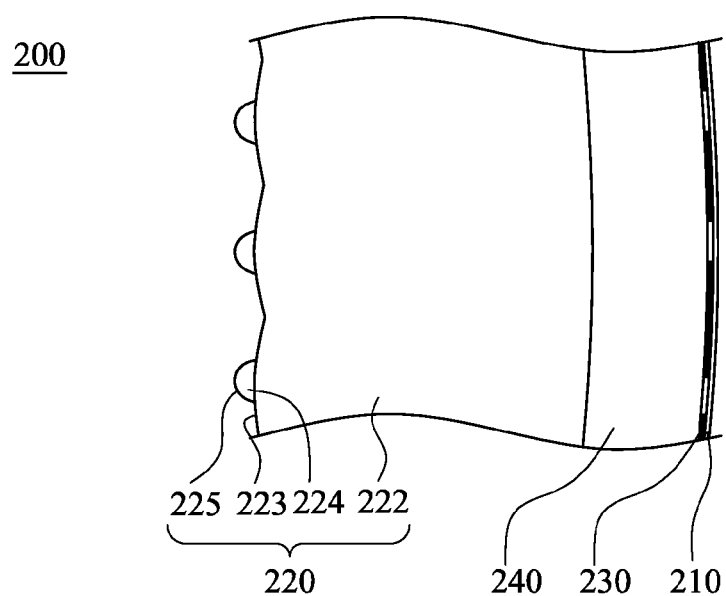
FIG. 4 is a cross-sectional view of a projection screen according to another embodiment of the present invention.

FIG. 4 is a cross-sectional view of a projection screen 200 according to another embodiment of the present invention, where the cross-sectional position is the same as FIG. 3. The difference between the present embodiment and the embodiment of FIG. 3 is the presence of an achromatic lens 240. In this embodiment, the projection screen 200 further includes the achromatic lens 240 disposed between the compound lenses 220 and the reflector 210. The achromatic lens 240 can further eliminate the vertical dispersion of the projection images I. Other relevant structural details of the present embodiment are all the same as the embodiment of FIG. 3, and, therefore, a description in this regard will not be repeated hereinafter.

Figure 5:
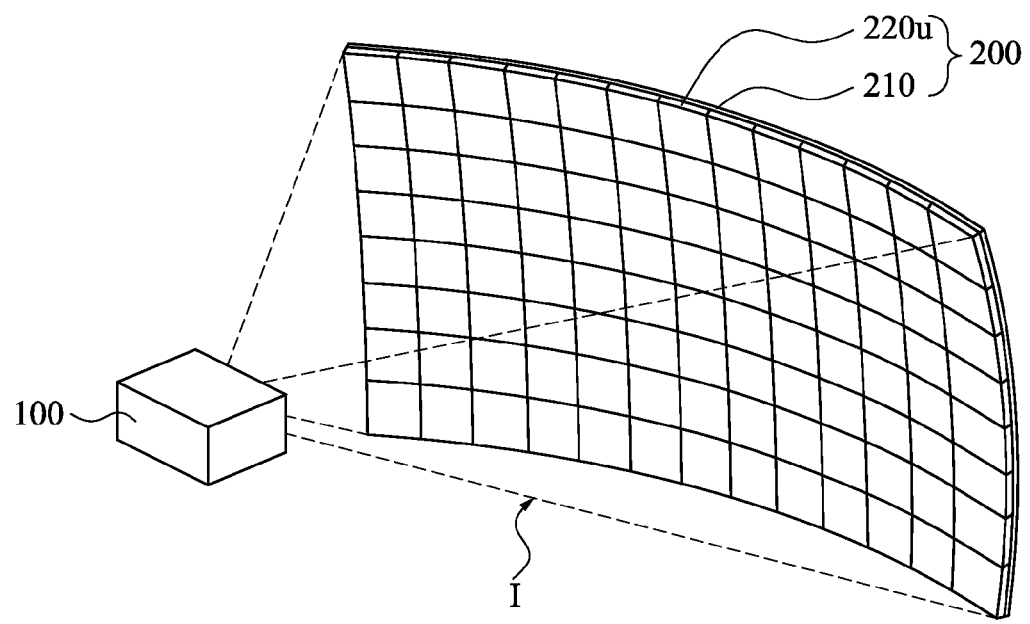
FIG. 5 is a three-dimensional diagram of a projection system according to another embodiment of the present invention.
Figure 6:
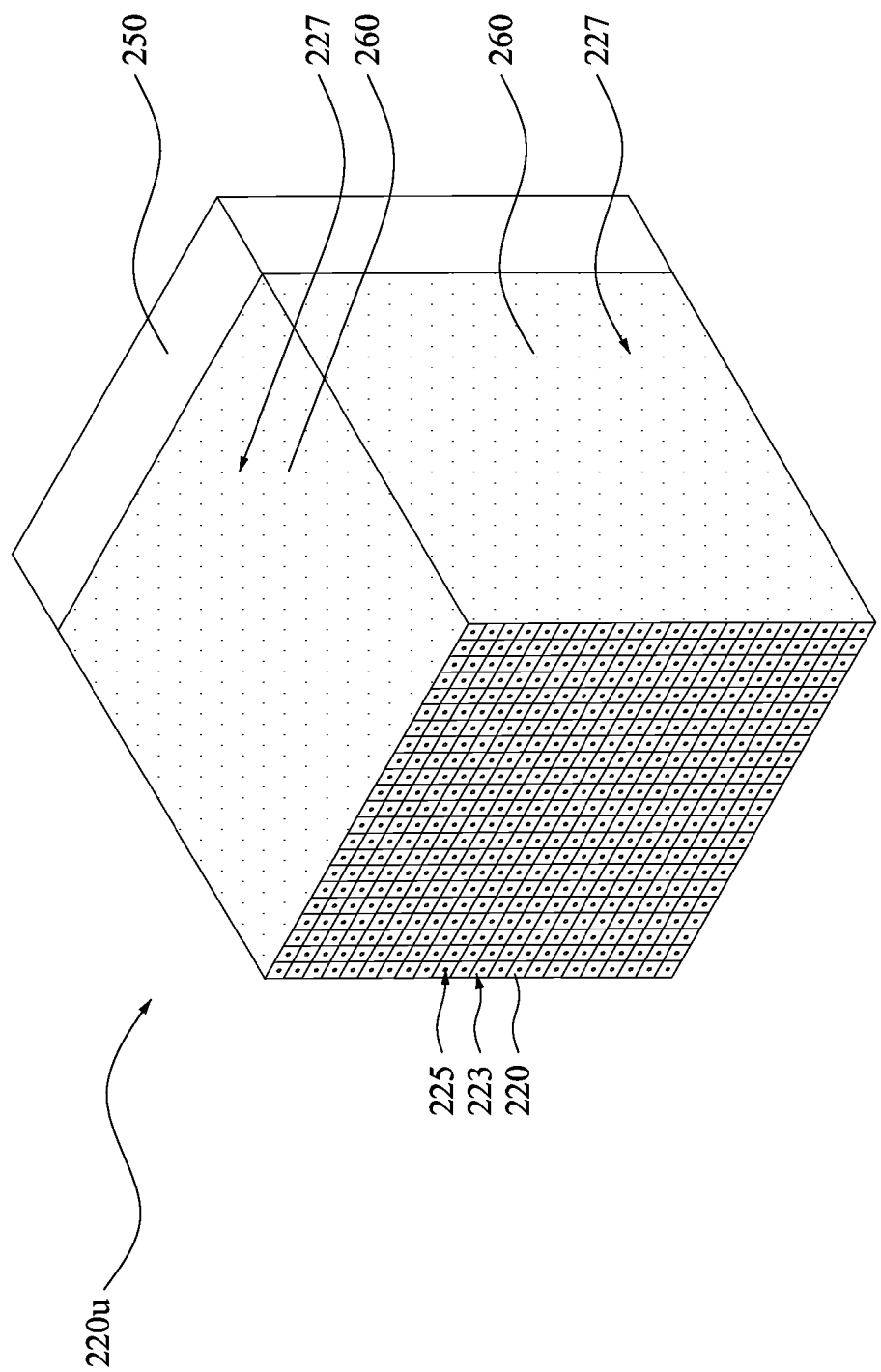
FIG. 6 a three-dimensional diagram of a compound lens unit and a transition and tilt mechanism of FIG. 5.
Figure 7:
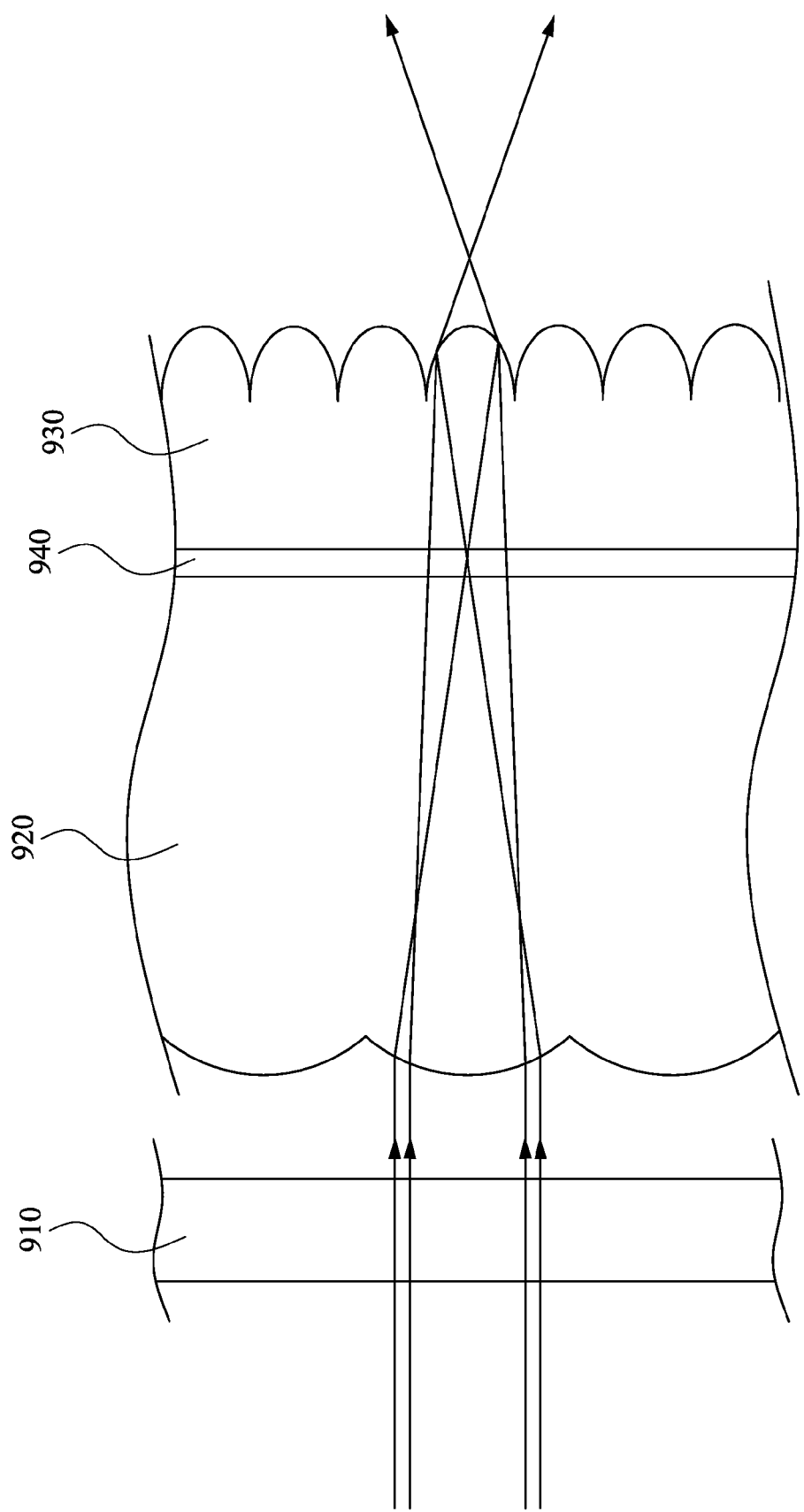
FIG. 7 is a schematic diagram of a conventional transmission projection screen.

FIG. 5 is a three-dimensional diagram of a projection system according to another embodiment of the present invention, and FIG. 6 a three-dimensional diagram of a compound lens unit 220u and a transition and tilt mechanism 250 of FIG. 5. In order to simplify the explanation, the relation of the elements may be not drawn to scale in FIG. 5. In this embodiment, the compound lenses 220 are assembled to be a plurality of the compound lens units 220u arranged along the reflective surface of the reflector 210 in an array manner. As mentioned above, if the reflector 210 is a spherical mirror, the array formed by the compound lenses 220 are curved in shape. The yield ratio and cost will be the problems of manufacturing the large-sized compound lens 200 array using a single mold. Therefore, in this embodiment, the compound lens units 220u can be manufactured with the same mold since they have the same thickness. Substantially, the compound lens units 220u can be assembled on the reflector 210 one by one, thereby simplifying the manufacturing process and saving the cost. Moreover, the same type of the compound lens units 220u can be assembled to form the projection screens 200 with different sizes. Without making a new mold, the manufacturing process of the projection screen 200 can be simplified and the cost can be saved.

In one or more embodiments, the projection screen 200 can further include a plurality of the transition and tilt mechanisms 250 respectively connected to the compound lens units 220u for respectively controlling the positions and the angles of the compound lens units 220u. More specifically, as mentioned above, the projection images I are normally incident the compound lenses 220, such that the transition and tilt mechanisms 250 can respectively adjust the compound lens units 220u connected thereto. Therefore, the compound lens units 220u in different positions can tilt or move according to the corresponding portions of the projection images I, and the projection images I can be normally incident the compound lenses 220.

Reference is made to FIG. 6. In this embodiment, the projection screen 200 can further include a plurality of black material layers 260 respectively covering sides 227 of the compound lens units 220u. The term "sides 227" herein is the surfaces of the compound lens units 220u that the projection images I do not pass therethrough, i.e., the surfaces except the surfaces 223 and 225 and the surface facing the reflector 210. More specifically, the black material layers 260 covers the sides 227, thereby reducing the effect of ambient light and enhancing the contrast ratio of the projection images I. Other relevant structural details of the present embodiment are all the same as the embodiment of FIG. 3, and, therefore, a description in this regard will not be repeated hereinafter.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A projection screen comprising:
   a reflector; and
   a plurality of compound lenses arranged at the same side of the reflector in an array manner, each of the compound lenses having a first lens portion and a second lens portion, the first lens portion being disposed between the second lens portion and the reflector, a surface of the first lens portion opposite to the reflector having a first radius of curvature, and a surface of the second lens portion opposite to the reflector having a second radius of curvature, the first radius of curvature having a length greater than the second radius of curvature;
   wherein the first lens portion is a convex lens portion, and a lens pupil is imaged by the compound lenses and enlarges to the viewing zone of the projection screen.

2. The projection screen of claim 1, wherein the reflector is a curved minor, and the compound lenses are assembled to be a plurality of compound lens units arranged along the reflector in an array manner.

3. The projection screen of claim 2, further comprising:
   a plurality of transition and tilt mechanism respectively connected to the compound lens units for respectively controlling positions and angles of the compound lens units.

4. The projection screen of claim 2, further comprising:
   a plurality of black material layers respectively covering sides of the compound lens units.

5. The projection screen of claim 1, further comprising:
   a plurality of black material layers respectively disposed between the reflector and the compound lenses, each of the black material layers having an opening to expose a portion of the reflector.

6. The projection screen of claim 1, wherein the reflector is a spherical surface mirror.

7. The projection screen of claim 1, further comprising:
   an achromatic lens disposed between the compound lenses and the reflector.

8. A projection system comprising:
   a projector configured for providing a plurality of projection images; and
   the projection screen of claim 1, wherein the projection images are incidental to the projection screen from the first lens portions of the compound lenses, and emerge from the second lens portions of the compound lenses after being reflected by the reflector.

9. The projection system of claim 8, wherein each of the projection images has a plurality of pixels, the light of the pixels are respectively incident the compound lenses.

10. The projection system of claim 8, wherein the projection images are normally incidental to the compound lenses.

* * * * *